US012306587B2

(12) United States Patent
Xiao et al.

(10) Patent No.: US 12,306,587 B2
(45) Date of Patent: May 20, 2025

(54) WATERPROOF BEZEL, LIGHT-TRANSMISSIVE WATCH PANEL, AND WATCH PROTECTION CASE

(71) Applicant: Shenzhen Beiyang Technology Co., Ltd., Shenzhen (CN)

(72) Inventors: Jian Xiao, Shenzhen (CN); Li Huang, Shenzhen (CN)

(73) Assignee: Shenzhen Beiyang Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/650,101

(22) Filed: Apr. 30, 2024

(65) Prior Publication Data

US 2025/0060706 A1 Feb. 20, 2025

(30) Foreign Application Priority Data

Aug. 18, 2023 (CN) ......................... 202311051795.4
Dec. 26, 2023 (CN) ......................... 202323564908.9
Feb. 3, 2024 (CN) ......................... 202410164698.4
Feb. 3, 2024 (CN) ......................... 202410164713.5

(51) Int. Cl.
*G04B 39/02* (2006.01)
*G04B 37/00* (2006.01)
*G04B 37/08* (2006.01)

(52) U.S. Cl.
CPC ......... *G04B 39/02* (2013.01); *G04B 37/0008* (2013.01); *G04B 37/08* (2013.01)

(58) Field of Classification Search
CPC .... G04B 39/02; G04B 37/0008; G04B 37/08; G06F 1/163; G06F 1/1656; G04G 17/00; A45C 11/10
USPC .................................................. 368/291, 294
See application file for complete search history.

(56) References Cited

U.S. PATENT DOCUMENTS 3,355,873 A * 12/1967 Morf .................... G04B 37/066 368/292
11,422,507 B2 * 8/2022 Wang ...................... G04B 37/22
2016/0058375 A1 * 3/2016 Rothkopf ................ G06F 1/163 600/323
2018/0070468 A1 * 3/2018 Yanagisawa ......... H05K 5/0086
2019/0137951 A1 * 5/2019 Uematsu ................ G04R 60/08
2021/0195772 A1 * 6/2021 Ko .......................... G06F 1/163
(Continued)

FOREIGN PATENT DOCUMENTS

CN 212933269 U * 4/2021

*Primary Examiner* — Edwin A. Leon
*Assistant Examiner* — Kevin Andrew Johnston
(74) *Attorney, Agent, or Firm* — Bayramoglu Law Offices LLC

(57) ABSTRACT

A waterproof bezel, a light-transmissive watch panel, and a watch protection case are provided. The watch protection case includes a watch screen protection panel, a waterproof bezel, and a housing. The housing is provided with a clamping groove, such that the watch screen protection panel is quickly mounted to the housing. The waterproof bezel includes a first bezel body and a second bezel body that are connected along an axial direction of the waterproof bezel. The first bezel body can bond the watch screen protection panel. The second bezel body can abut against a watch screen. An acute angle is formed between the second bezel body and the first bezel body. A deformation space is formed between a portion of the first bezel body and a portion of the second bezel body that form the acute angle.

6 Claims, 10 Drawing Sheets

(56) References Cited

U.S. PATENT DOCUMENTS

| | | | | |
|---|---|---|---|---|
| 2021/0391930 | A1* | 12/2021 | Davis | G06F 1/169 |
| 2023/0341820 | A1* | 10/2023 | Born | G04G 17/02 |

* cited by examiner

WATERPROOF BEZEL, LIGHT-TRANSMISSIVE WATCH PANEL, AND WATCH PROTECTION CASE

CROSS REFERENCE TO THE RELATED APPLICATIONS

This application is based upon and claims priority to Chinese Patent Applications No. 202311051795.4, filed on Aug. 18, 2023; No. 202323564908.9, filed on Dec. 26, 2023; No. 202410164713.5, filed on Feb. 3, 2024; and No. 202410164698.4, filed on Feb. 3, 2024, the entire contents of which are incorporated herein by reference.

TECHNICAL FIELD

The present disclosure relates to the technical field of watches, and in particular to a waterproof bezel, a light-transmissive watch panel, and a watch protection case.

BACKGROUND

With ever more rich life scenes, increasingly more requirements are imposed on waterproof functions of a watch when used. Usually, the watch is protected by a waterproof watch protection case. A waterproof bezel is typically provided between the watch and a glass panel of the protection case. The waterproof bezel can abut against a surface of the watch, such that a sealed waterproof space is formed between a dial and the glass panel of the watch, thereby achieving the waterproof effect of the watch. The conventional waterproof bezel is an annular structure. With a circular or square cross section, the waterproof bezel is provided between the glass panel and a housing of the protection case to form the waterproof space. However, the conventional waterproof bezel has an unsatisfactory compression resistance, and is prone to damage when squeezed by the glass panel and the housing. The waterproof bezel is not attached to the dial. In case of a large pressure, a gap appears easily to cause water ingress to the waterproof space.

In addition, a side of the conventional watch protection case adjacent to a display screen of the watch is provided with the glass panel. The glass panel is provided on a mounting groove by pressing an adhesive. In this way, a black edge must be provided at a periphery of the glass panel in a silk-screen manner to cover the adhesive, which results in that a view window of the watch screen is decreased. Moreover, with respect to adhesive pressing, a fitness between the glass panel and the screen may be affected by a thickness and a pressure of the adhesive. The inaccurate fitness may lead to an insensitive touch of the smartwatch. To achieve the accurate fitness, a costly equipment process is required.

SUMMARY

The present disclosure provides a waterproof bezel, a light-transmissive watch panel, and a watch protection case, to solve problems of water ingress to a waterproof space for a gap of a waterproof bezel and a high mounting cost of a glass panel.

In order to solve the above technical problems, the present disclosure uses the following technical solutions:

According to a first aspect, the present disclosure provides a waterproof bezel, including a first bezel body and a second bezel body, where the first bezel body and the second bezel body are connected along an axial direction of the waterproof bezel; an acute angle is formed between the first bezel body and the second bezel body; a deformation space is formed between a portion of the first bezel body and a portion of the second bezel body that from the acute angle; the first bezel body is configured to bond a watch screen protection panel; and the second bezel body is configured to abut against a watch screen.

According to a second aspect, the present disclosure provides a waterproof bezel, including a first bezel body and a second bezel body, where the first bezel body and the second bezel body are connected along an axial direction of the waterproof bezel; the second bezel body extends obliquely from an inner side of the first bezel body to an outer side of the first bezel body; a deformation space is formed between an outward obliquely-extending portion of the second bezel body and the first bezel body; the deformation space is located at an outer side of the waterproof bezel; the first bezel body is configured to bond a watch screen protection panel; and the second bezel body is configured to abut against a watch screen.

According to a third aspect, the present disclosure provides a light-transmissive watch panel, including a watch screen protection panel and the waterproof bezel, where the first bezel body is bonded to the watch screen protection panel.

According to a fourth aspect, the present disclosure provides a watch protection case, including a housing and the light-transmissive watch panel, where a light-transmissive window and a light-transmissive port are sequentially provided from a front surface of the housing to a back surface of the housing; and the watch screen protection panel is fixedly provided on an inner wall of the light-transmissive port.

According to a fifth aspect, the present disclosure provides a watch protection case, including:

- a housing provided with a front surface and a back surface, where along a direction from the front surface to the back surface, a light-transmissive window and a light-transmissive port are sequentially provided at the front surface of the housing, and a clamping groove is formed in an inner wall of the light-transmissive port; and
- a light-transmissive panel, where an edge of the light-transmissive panel is mounted in the clamping groove.

According to the above technical solutions, embodiments of the present disclosure have at least the following beneficial effects.

According to the waterproof bezel, the light-transmissive watch panel, and the watch protection case provided by the embodiments of the present disclosure, the waterproof bezel is bonded to the watch screen protection panel to form the light-transmissive watch panel, thereby protecting the watch screen. The watch protection case along a direction from a front surface to a back surface is provided with a light-transmissive window and a light-transmissive port. A clamping groove for mounting an edge of the watch screen protection panel is formed in an inner wall of the light-transmissive port. The watch screen protection panel can be quickly clamped into the clamping groove and fixed relative to the housing. This solves the problem of a black edge of adhesive connection, and lowers a mounting cost. The waterproof bezel includes a first bezel body and a second bezel body. The first bezel body and the second bezel body are connected along an axial direction of the waterproof bezel. An acute angle is formed between the first bezel body and the second bezel body. A deformation space is formed between a portion of the first bezel body and a portion of the second bezel body that form the acute angle. The first bezel body can bond the watch screen protection panel. The second bezel body is configured to abut against the watch screen. When the watch screen is intensified to squeeze the second bezel body, the included angle between the first bezel body and the second bezel body is deceased, and the second bezel body has an increased abutting force against the watch screen and abuts against the watch screen more tightly. This enhances a deformation resistance of the waterproof bezel, and prevents a gap between the waterproof bezel and the watch screen to cause water ingress to the watch screen when the watch screen squeezes the waterproof bezel excessively.

BRIEF DESCRIPTION OF THE DRAWINGS

To describe the technical solutions in the embodiments of the present disclosure or in the prior art more clearly, the following briefly describes the drawings required for describing the embodiments or the prior art. Apparently, the drawings in the following description show some embodiments of the present disclosure, and those of ordinary skill in the art may still derive other drawings from these drawings without creative efforts.

REFERENCE NUMERALS

1: watch protection case, 20: housing, 30: light-transmissive watch panel, 5: watch body, and 51: watch screen; and

300: waterproof bezel, 310: first bezel body, 311: first connecting surface, 320: second bezel body, 321: second connecting surface, 322: conical surface, 330: deformation space, 400: watch screen protection panel, 21: front surface, 22: back surface, 23: light-transmissive window, 24: light-transmissive port, 241: clamping groove, 242: convex edge, 243: snap edge, 2431: guiding surface, 2432: clamping surface, 25: first shell, 251: hook, 26: second shell, 261: clamping edge, 262: opening, and 27: mounting space.

DETAILED DESCRIPTION OF THE EMBODIMENTS

The typical implementations embodying the features and advantages of the present disclosure are described in detail below. It should be understood that the present disclosure may have various changes in different implementations, which do not depart from the scope of the present disclosure. The description and drawings herein are essentially used for the purpose of explanation, rather than to limit the present disclosure.

In addition, the terms "first" and "second" are merely intended for a purpose of description, and shall not be understood as an indication or implication of relative importance or implicit indication of a quantity of indicated technical features. Therefore, the features defined by "first" and "second" can explicitly or implicitly include one or more features. In the description of the present application, "multiple" means two or more, unless otherwise specifically defined.

In the description of the present disclosure, it should be noted that, unless otherwise clearly specified, meanings of terms "mount", "connect with", and "connect to" should be understood in a broad sense. For example, the connection may be a fixed connection, a removable connection, or an integral connection; may be a mechanical connection or an electrical connection; may be a direct connection or an indirect connection by using an intermediate medium; or may be intercommunication between two components. Those of ordinary skill in the art may understand the specific meanings of the above terms in the present disclosure based on specific situations.

Figure 1:
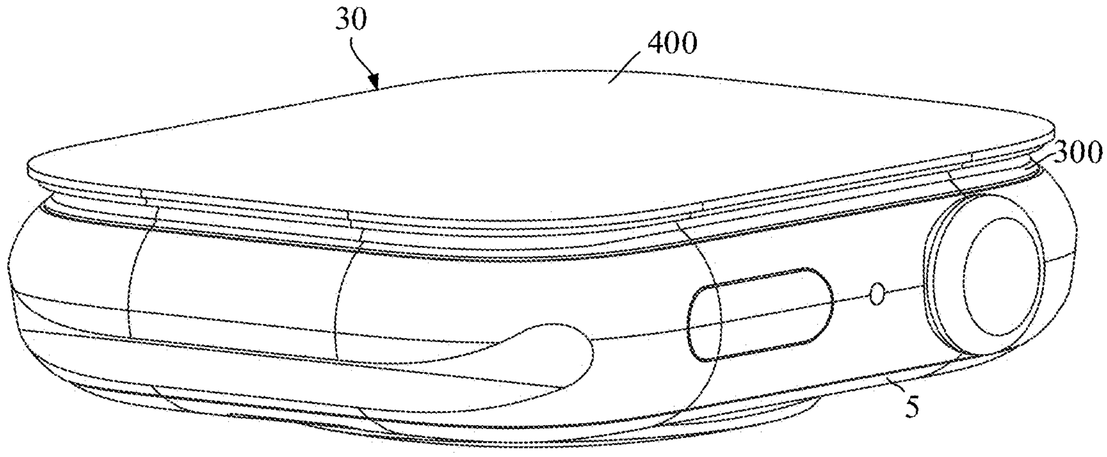
FIG. 1 is a schematic structural view of a waterproof bezel in use according to a first embodiment of the present disclosure.
Figure 2:
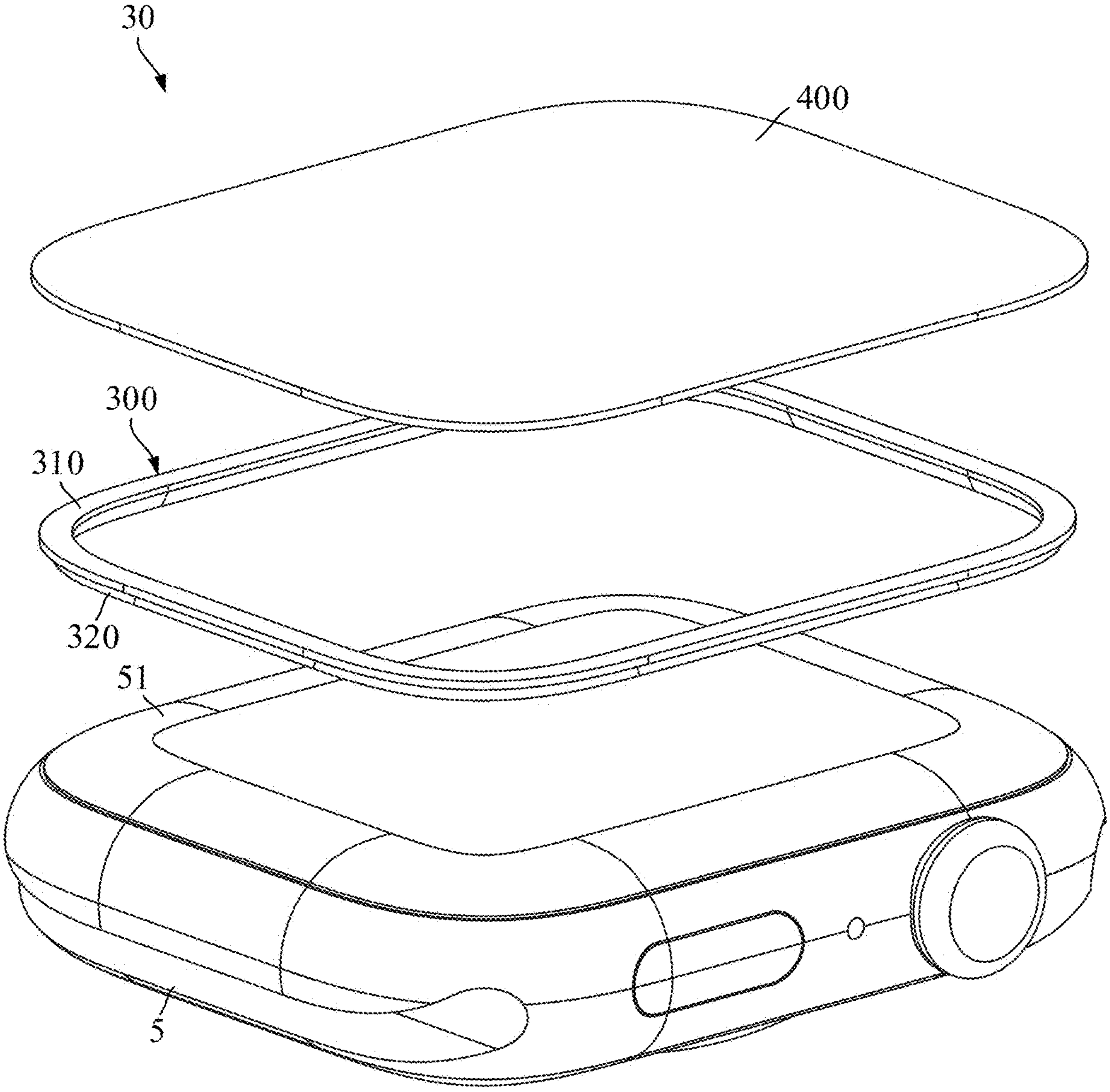
FIG. 2 is a schematic exploded view of a light-transmissive watch panel according to a second embodiment of the present disclosure.
Figure 3:
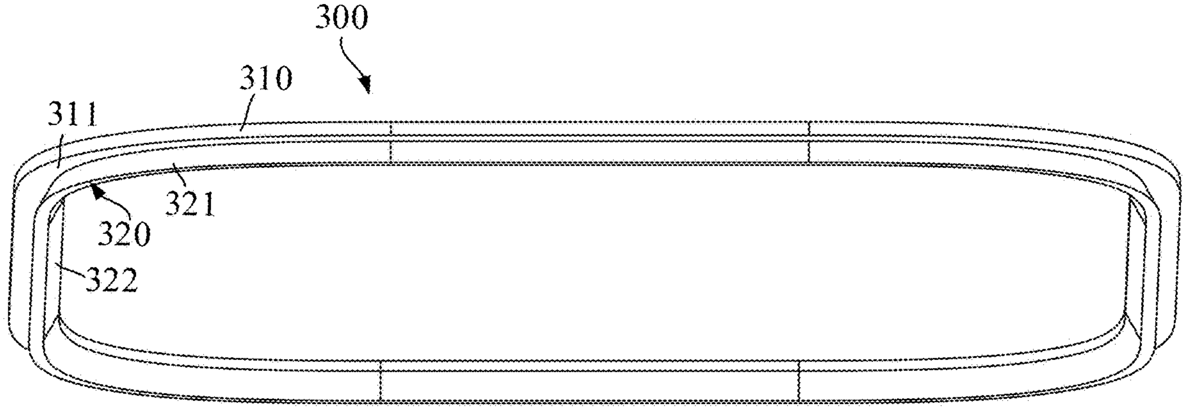
FIG. 3 is an overall schematic structural view of the waterproof bezel shown in FIG. 1.
Figure 4:
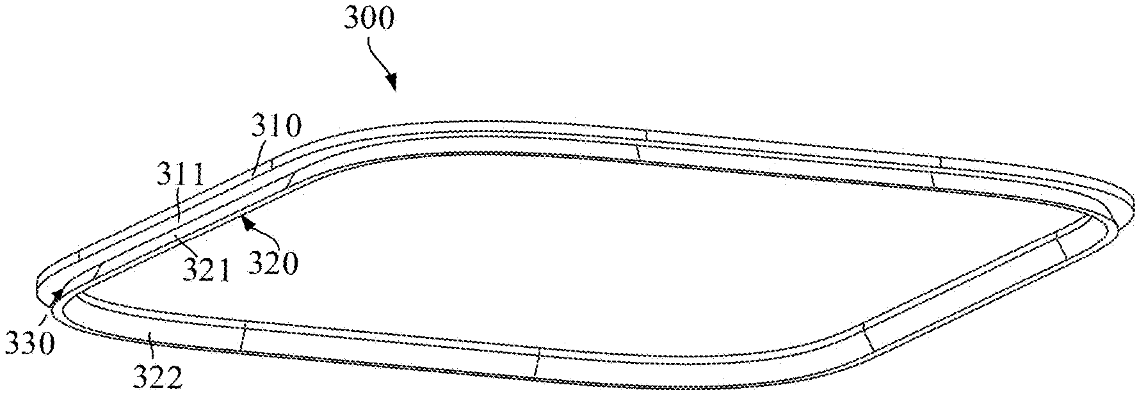
FIG. 4 is an overall schematic structural view of the waterproof bezel shown in FIG. 1 from another perspective.
Figure 5:
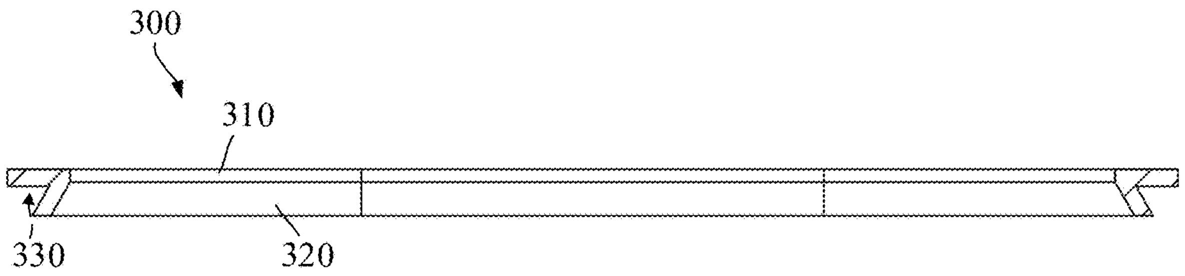
FIG. 5 is a schematic sectional view of the waterproof bezel shown in FIG. 1.

Referring to FIG. 1 and FIG. 2, the present disclosure provides waterproof bezel 300. The waterproof bezel 300 includes one side bonded to watch screen protection panel 400, and the other side configured to abut against watch screen 51, thereby realizing a waterproof effect of the watch screen 51. The watch may be a wearable smartwatch. Specifically, the waterproof bezel 300 includes first bezel body 310 and second bezel body 320. The first bezel body 310 is configured to bond the watch screen protection panel 400. The second bezel body 320 is configured to abut against the watch screen 51. The first bezel body 310 and the second bezel body 320 are connected along an axial direction of the waterproof bezel 300. An acute angle is formed between the first bezel body 310 and the second bezel body 320. When the watch screen protection panel 400 squeezes the first bezel body 310, and the watch screen 51 squeezes the second bezel body 320, the included angle between second bezel body 320 and the first bezel body 310 is decreased, and the second bezel body 320 abuts against the watch screen 51 more tightly. This enhances a deformation resistance of the waterproof bezel 300, and prevents a gap between the waterproof bezel 300 and the watch screen 51 to cause water ingress to the watch screen 51 when the watch screen 51 squeezes the waterproof bezel 300 excessively.

Referring to FIG. 2 to FIG. 5, the first bezel body 310 and the second bezel body 320 each are a circumferentially closed annular structure. The first bezel body 310 is coaxial with the second bezel body 320. A central region of the first bezel body 310 and a central region of the second bezel body 320 are connected and configured to allow light of the watch screen 51 to transmit. The first bezel body 310 and the second bezel body 320 are integrally formed by casting. The first bezel body 310 and the second bezel body 320 are made of an elastic material, such that the waterproof bezel 300 can deform and accumulate an elasticity when abutting against the watch screen 51. A junction between the first bezel body 310 and the second bezel body 320 is formed into an acute angle. Deformation space 330 is formed between a portion of the first bezel body 310 and a portion of the second bezel body 320 that form the acute angle. When the first bezel body 310 and the second bezel body 320 are squeezed, the deformation space 330 can be changed, and the second bezel body 320 and the first bezel body 310 store an elasticity to enhance airtightness when the waterproof bezel 300 abuts against the watch screen 51.

It is to be noted that an outer contour of the first bezel body 310 and an outer contour of the second bezel body 320 are the same as an outer contour of the watch screen 51. The contour of the first bezel body 310 and the contour of the second bezel body 320 are square, such that the second bezel body 320 does not cause a gap with the watch screen 51 when attaching to the watch screen 51.

It is to be understood that the first bezel body 310 and the second bezel body 320 may also be set as other shapes to meet size requirements of different watches. Two adjacent surfaces inside the second bezel body 320 are transitionally connected through an arc structure, such that the second bezel body 320 is better attached to the watch screen 51. Meanwhile, when the watch screen 51 squeezes the second bezel body 320, the arc structure can reduce stress concentration, and make the second bezel body 320 more compression-resistant and durable, such that the squeezed second bezel body is restored to an original state more easily, thereby improving the airtightness.

In the embodiment, the deformation space 330 is located at an outer side of the waterproof bezel 300. That is, the deformation space 330 is located at a side of the second bezel body 320 facing away from a bezel center. An inner surface of a side of the second bezel body 320 facing the bezel center is conical surface 322. The conical surface 322 abuts against the watch screen 51. The conical surface 322 is a circumferentially closed cone. A space circumferentially enclosed by the conical surface 322 is a conical space. In a direction from the second bezel body 320 to the first bezel body 310 along the axial direction of the waterproof bezel 300, an inner diameter of the conical surface 322 is decreased gradually. When the second bezel body 320 abuts against the watch screen 51, a contact area between the second bezel body 320 and the watch screen 51 is increased, such that water passes through a contact surface between the second bezel body 320 and the watch screen 51 hardly to achieve a better waterproof effect of the waterproof bezel 300. In other embodiments, it is to be noted that the deformation space 330 may also be formed at an inner side of the waterproof bezel 300. That is, the deformation space 330 is located at the side of the second bezel body 320 facing the bezel center. In the direction from the second bezel body 320 to the first bezel body 310 along the axial direction of the waterproof bezel 300, an inner diameter of the conical surface 322 is increased gradually. When the watch screen 51 squeezes the second bezel body 320, the deformation space 330 is decreased, and the second bezel body 320 accumulates an elasticity, with an increased abutting force against the watch screen 51. Therefore, the waterproof bezel 300 abuts against the watch screen 51 more tightly.

The first bezel body 310 is provided with first connecting surface 311. The first connecting surface 311 is located at a side of the first bezel body 310 adjacent to the second bezel body 320. The first connecting surface 311 is connected to the second bezel body 320. The first connecting surface 311 is perpendicular to the axial direction of the waterproof bezel 300. A side of the second bezel body 320 facing away from the conical surface 322 is provided with second connecting surface 321. The second connecting surface 321 is oblique to the axial direction of the waterproof bezel 300. The second connecting surface 321 and the first connecting surface 311 are connected in an acute angle. The included angle between the second connecting surface 321 and the first connecting surface 311 forms the deformation space 330. When the included angle between the second connecting surface 321 and the first connecting surface 311 is 45° to 75°, the waterproof bezel 300 achieves the best waterproof effect and the best deformation effect.

A circumferential contour of the conical surface 322 is the same as the outer contour of the watch screen 51, such that the conical surface 322 can be attached to the watch screen 51 tightly. When the second bezel body 320 abuts against the watch screen 51, the conical surface 322 comes in contact with the watch screen 51, and contact points between the conical surface 322 and the watch screen 51 form a circumferentially closed annular shape, such that there is no gap between the conical surface 322 and the watch screen 51 in a circumferential direction to cause water ingress. When the watch screen 51 continues to squeeze the conical surface 322, the second bezel body 320 deforms and accumulates an elasticity. In this case, the included angle between the second connecting surface 321 and the first connecting surface 311 is decreased, and the deformation space 330 is decreased, such that the conical surface 322 has an increased abutting elasticity against the watch screen 51, and the conical surface 322 is attached to the watch screen 51 more tightly. Meanwhile, due to the deformation of the second bezel body 320, an attached area between the conical surface 322 and the watch screen 51 is increased to enhance the waterproofness of the waterproof bezel 300.

The second connecting surface 321 is a circumferentially closed structure along the second bezel body 320. In the direction from the second bezel body 320 to the first bezel body 310 along the axial direction of the waterproof bezel 300, an axial distance from the second connecting surface 321 to the waterproof bezel 300 is decreased gradually. In the embodiment, each position of the second connecting surface 321 is parallel to the corresponding conical surface 322. When the watch screen 51 squeezes the conical surface 322, the second connecting surface 321 and the conical surface 322 have a same degree of deformation. It is to be noted that the second connecting surface 321 may also form an included angle with the conical surface 322. For example, an obliqueness of the conical surface 322 relative to the axial direction of the waterproof bezel 300 is greater than an obliqueness of the second connecting surface 321 relative to the axial direction of the waterproof bezel 300. That is, the included angle between the second connecting surface 321 and the first connecting surface 311 is greater than an included angle between the conical surface 322 and the first connecting surface 311. In this structure, when the watch screen 51 squeezes the conical surface 322, the second bezel body 320 does not deform excessively to cause a damage.

In other embodiments, it is to be understood that the included angle between the first bezel body 310 and the second bezel body 320 may also be greater than or equal to 90°. The second bezel body 320 extends obliquely from an inner side of the first bezel body 310 to an outer side of the first bezel body 310. Deformation space 330 is formed between an outward obliquely-extending portion of the second bezel body 320 and the first bezel body 310. The deformation space 330 is located at an outer side of the waterproof bezel 300. The first bezel body 310 is also provided with first connecting surface 311. The first connecting surface 311 is provided at a side of the first bezel body 310 adjacent to the second bezel body 320. The first connecting surface 311 is oblique to the axial direction of the waterproof bezel 300. In the direction from the second bezel body 320 to the first bezel body 310 along the axial direction of the waterproof bezel 300, a distance from the first connecting surface 311 to an axis of the waterproof bezel 300 is increased gradually. The first connecting surface 311 surrounds the first bezel body 310 to form a circumferentially enclosed surface. An outer side of the second bezel body 320 is also provided with second connecting surface 321. The second connecting surface 321 is oblique to the axial direction of the waterproof bezel 300. In the direction from the second bezel body 320 to the first bezel body 310 along the axial direction of the waterproof bezel 300, a distance from the second connecting surface 321 to the axis of the waterproof bezel 300 is decreased gradually. An included angle between the first connecting surface 311 and the second connecting surface 321 may be greater than or equal to 90°. The included angle between the first connecting surface 311 and the second connecting surface 321 forms the deformation space 330. When the watch screen 51 squeezes an inner side of the second bezel body 320, the second bezel body 320 deforms and accumulates an elasticity. In this case, the included angle between the second connecting surface 321 and the first connecting surface 311 is decreased, and the deformation space 330 is decreased. The inner side of the second bezel body 320 has an increased abutting elasticity against the watch screen 51, and the second bezel body 320 is attached to the watch screen 51 more tightly. Meanwhile, an attached area between the inner side of the second bezel body 320 and the watch screen 51 is increased to enhance the waterproofness of the waterproof bezel 300.

Referring to FIG. 2, the present disclosure further provides light-transmissive watch panel 30. The light-transmissive watch panel 30 includes watch screen protection panel 400 and the waterproof bezel 300. The watch screen protection panel 400 is configured to protect the watch screen 51, so as to prevent the watch screen 51 from being scratched. The watch screen protection panel 400 is made of a light-transmissive material. The watch screen protection panel 400 is boned to a side of the first bezel body 310 facing away from the second bezel body 320. A thickness direction of the watch screen protection panel 400 is parallel to the axial direction of the waterproof bezel 300. When the watch screen protection panel 400 is bonded to the first bezel body 310, an opening space at the side of the first bezel body 310 facing away from the second bezel body 320 is sealed by the watch screen protection panel 400, and a bonded position between the watch screen protection panel 400 and the first bezel body 310 is airtight for water isolation.

Referring to FIG. 6 to FIG. 9, the present disclosure further provides watch protection case 1. The watch protection case 1 can be sleeved on watch body 5, so as to protect the watch body 5. The watch protection case 1 includes housing 20 and the light-transmissive watch panel 30. The housing 20 is sleeved on the watch body 5 to protect the watch body 5. The housing 20 is provided with front surface 21 and back surface 22 that are opposite to each other. Along a direction from the front surface 21 to the back surface 22, light-transmissive window 23 and light-transmissive port 24 are sequentially provided at the front surface 21 of the housing 20. The light-transmissive window 23 can allow the watch screen 51 to display. Clamping groove 241 is formed in an inner wall of the light-transmissive port 24. The watch body 5 can be mounted in the light-transmissive port 24. The watch screen protection panel 400 is bonded to waterproof bezel 300. An edge of the waterproof bezel 300 is located inside an edge of the watch screen protection panel 400. The edge of the watch screen protection panel 400 can be embedded into the clamping groove 241, such that the watch screen protection panel 400 is quickly mounted to the housing 20. The waterproof bezel 300 is located in the light-transmissive port 24. The watch screen protection panel 400 is located at a side of the light-transmissive port 24 adjacent to the light-transmissive window 23. Compared with conventional adhesive connection, no adhesive stain is produced on the watch screen protection panel 400 in the present disclosure, such that a black edge is prevented after the watch screen protection panel 400 is mounted. The watch screen protection panel 400 is mounted quickly and conveniently, with a lower process cost.

The light-transmissive window 23 is provided at the front surface 21. When the watch body 5 is mounted in the light-transmissive port 24, the watch screen 51 is adjacent to the front surface 21. The waterproof bezel 300 is provided between the watch screen protection panel 400 and the watch body 5. Light of the watch screen 51 enters human eyes through the watch screen protection panel 400 and the light-transmissive window 23. The light-transmissive window 23 is an open structure. The light-transmissive window 23 penetrates through the front surface 21 and communicates with the light-transmissive port 24. The clamping groove 241 is formed in the inner wall of the side of the light-transmissive port 24 adjacent to the light-transmissive window 23. A distance from the edge of the waterproof bezel 300 to the edge of the watch screen protection panel 400 is greater than a depth of the clamping groove 241, such that the waterproof bezel 300 does not obstruct the watch screen protection panel 400 from being embedded into the clamping groove 241, thereby fixing the watch screen protection panel 400.

Convex edge 242 and snap edge 243 are arranged on the inner wall of the light-transmissive port 24. The convex edge 242 and the snap edge 243 are opposite and spaced along the direction from the front surface 21 to the back surface 22. A side of the convex edge 242 facing away from the snap edge 243 is located on the front surface 21. A gap between the convex edge 242 and the snap edge 243 forms the clamping groove 241. It is to be understood that the clamping groove 241 is formed by two spaced bump structures that extend from the inner wall of the light-transmissive port 24 to a center of the light-transmissive port 24. In other embodiments, the clamping groove 241 may also be formed by making the inner wall of the light-transmissive port 24 recessed inward. For example, the inner wall of the light-transmissive port 24 is recessed toward a direction away from the center of the light-transmissive port 24 to form a concave structure. The concave structure is the clamping groove 241. When the watch screen protection panel 400 is clamped into the clamping groove 241, the edge of the watch screen protection panel 400 is squeezed by the inner wall of the light-transmissive port 24 to cause deformation. The watch screen protection panel 400 is pushed continuously, with the edge sliding into the clamping groove 241, and thus the watch screen protection panel 400 is fixedly mounted.

In other embodiments, it is to be noted that the light-transmissive window 23 may also be a closed structure. For example, the light-transmissive window 23 is provided at the front surface 21 and seals the light-transmissive port 24.

The light-transmissive window 23 is made of a light-transmissive material, such as light-transmissive plastic. The light-transmissive window 23 is integrally formed with the housing 20 by casting. In this case, the inner wall of the light-transmissive port 24 may be only provided with the snap edge 243. The snap edge 243 and the light-transmissive window 23 are spaced, and a gap between the snap edge 243 and the light-transmissive window 23 forms the clamping groove 241. The edge of the watch screen protection panel 400 is embedded into the clamping groove 241. The waterproof bezel 300 is located out of the clamping groove 241.

Figure 6:
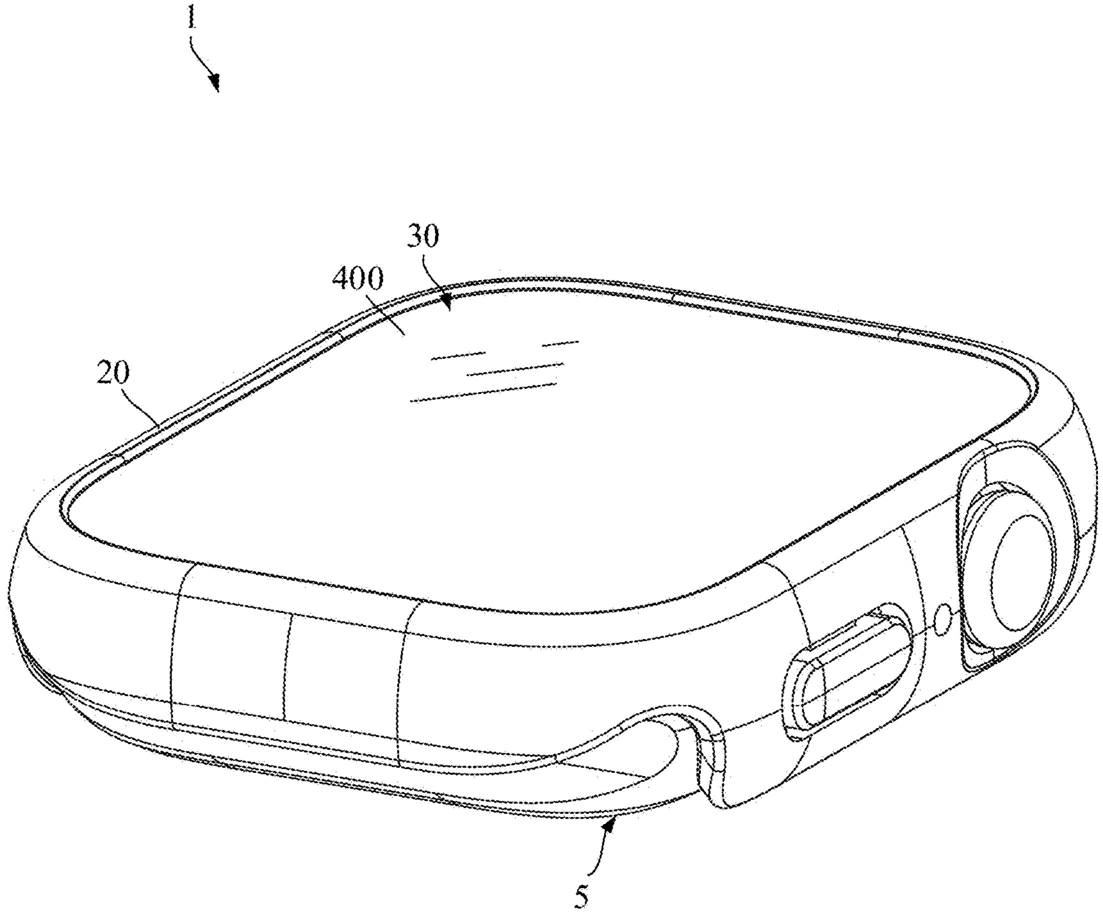
FIG. 6 is a schematic structural view of a watch protection case in use according to a third embodiment of the present disclosure.
Figure 7:
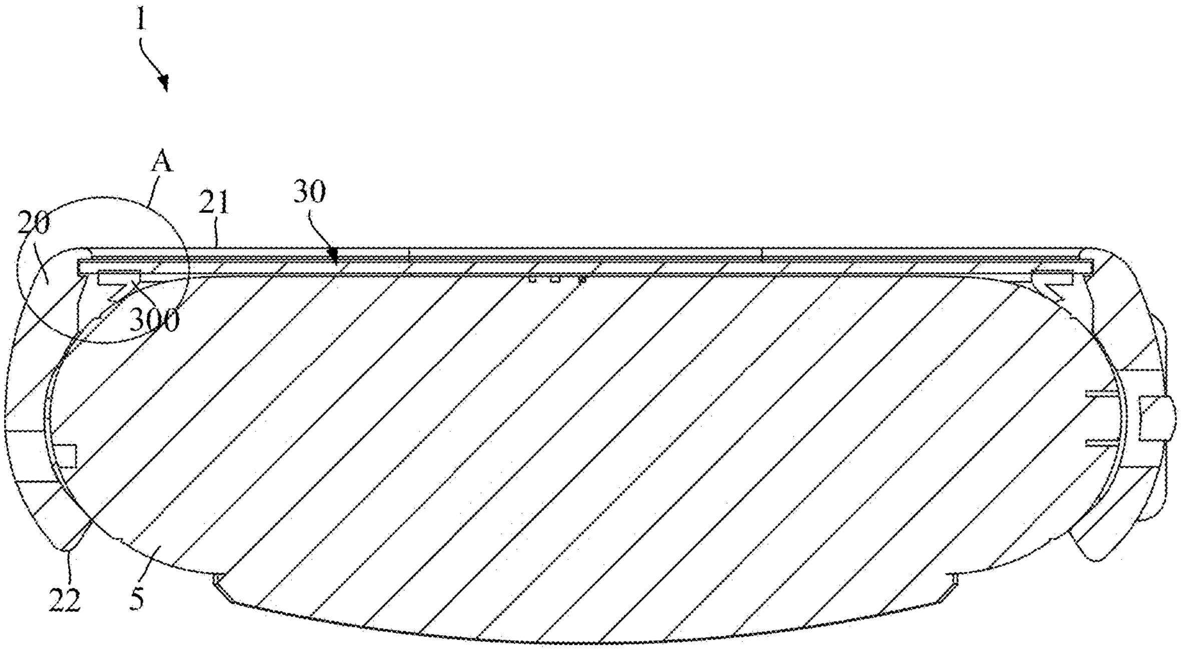
FIG. 7 is a schematic sectional view of the watch protection case shown in FIG. 6.

The light-transmissive window 23 communicates the light-transmissive port 24. The light-transmissive window 23 and the light-transmissive port 24 penetrate through the housing 20 along the direction from the front surface 21 to the back surface 22. The watch screen protection panel 400 and the waterproof bezel 300 can get into the light-transmissive port 24 through an opening at a side of the light-transmissive port 24 facing away from the light-transmissive window 23. The watch screen protection panel 400 and the waterproof bezel 300 are pushed continuously along the direction from the front surface 21 to the back surface 22, such that the edge of the watch screen protection panel 400 is embedded into and fixed in the clamping groove 241. In this case, the watch body 5 is mounted in the light-transmissive port 24 through the opening at the side of the light-transmissive port 24 facing away from the light-transmissive window 23. The watch screen 51 abuts against the second bezel body 320 of the waterproof bezel 300. The waterproof bezel 300 is clamped between the watch screen protection panel 400 and the watch screen 51. The second bezel body 320 is circumferentially attached to the watch screen 51. As shown in FIG. 6 and FIG. 7, when an external pressure is applied to the watch screen protection panel 400 and the watch body 5, the waterproof bezel 300 is squeezed along the axial direction of the waterproof bezel, such that the second bezel body 320 deforms and accumulates an elasticity, the included angle between the second bezel body 320 and the first bezel body 310 is decreased, the second bezel body 320 has an increased abutting force against the watch screen 51, and a contact area between the second bezel body 320 and the watch screen 51 is increased.

It is to be noted that due to the open structure of the light-transmissive window 23, the watch screen protection panel 400 and the waterproof bezel 300 may also get into the light-transmissive port 24 through the light-transmissive window 23. For example, an inclined surface or a curved surface oblique to the direction from the front surface 21 to the back surface 22 is provided at an inner side of the convex edge 242. The edge of the watch screen protection panel 400 can slide over the convex edge 242 along the inclined surface or the curved surface on the convex edge 242 and embedded into the clamping groove 241, such that the watch screen protection panel 400 and the waterproof bezel 300 are fixedly connected to the housing 20.

The convex edge 242 is circumferentially connected end-to-end along the inner wall of the light-transmissive port 24. A side of the convex edge 242 facing away from the snap edge 243 is located on the front surface 21. A hollow structure circumferentially enclosed by the convex edge 242 is the light-transmissive window 23. When the watch screen protection panel 400 is embedded into the clamping groove 241, the convex edge 242 of the annular structure can circumferentially abut against the watch screen protection panel 400, such that the watch screen protection panel 400 in the clamping groove 241 is stressed uniformly and more stably. It is to be noted that the convex edge 242 may also be a non-circumferentially closed annular structure. For example, there are a plurality of convex edges 242. The plurality of convex edges 242 are circumferentially spaced along the inner wall of the light-transmissive port 24. When the watch screen protection panel 400 slides into the clamping groove 241, the plurality of convex edges 242 abut against the watch screen protection panel 400, such that the watch screen protection panel 400 is limited in the clamping groove 241.

Figure 8:
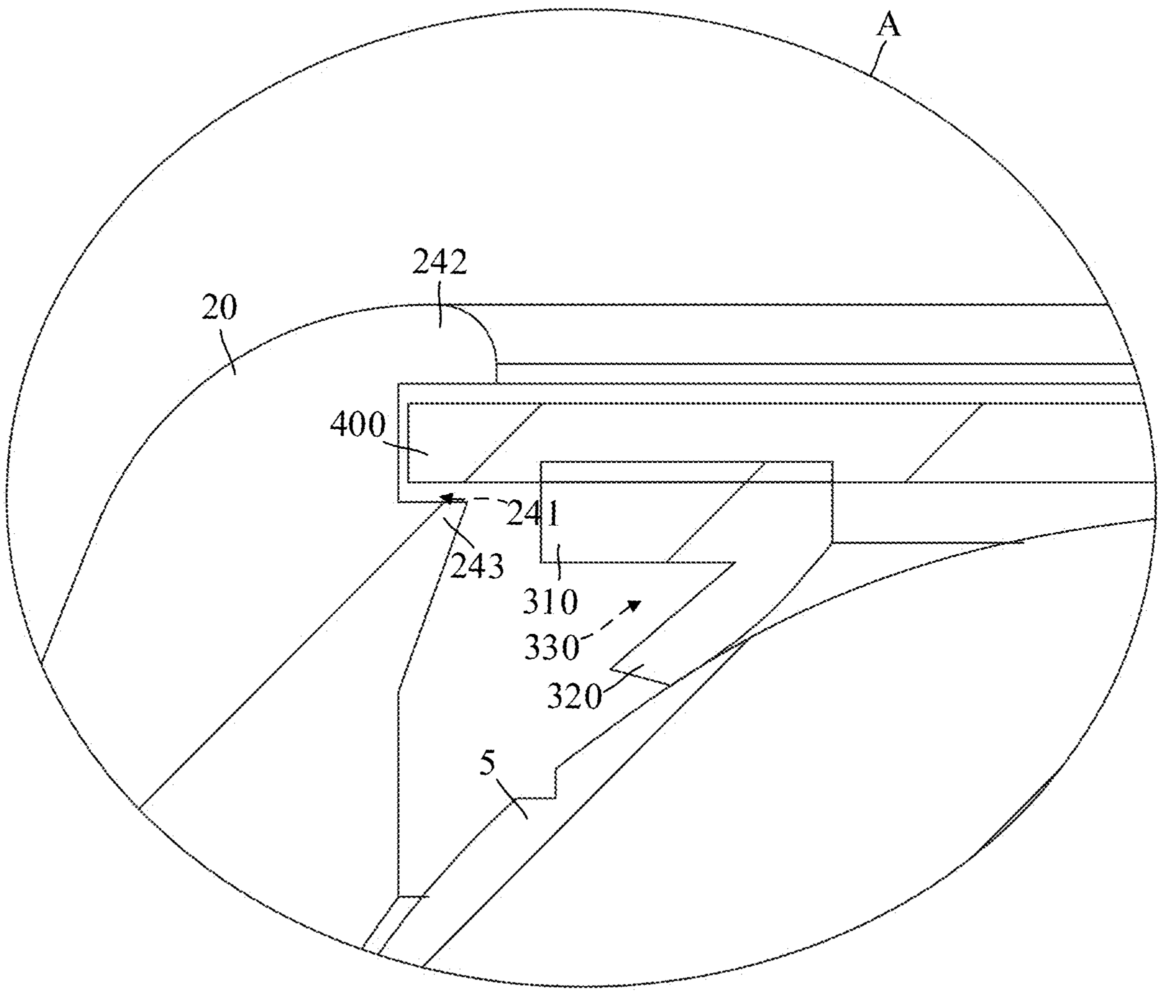
FIG. 8 is a schematic enlarged view of A of the watch protection case shown in FIG. 7.
Figure 9:
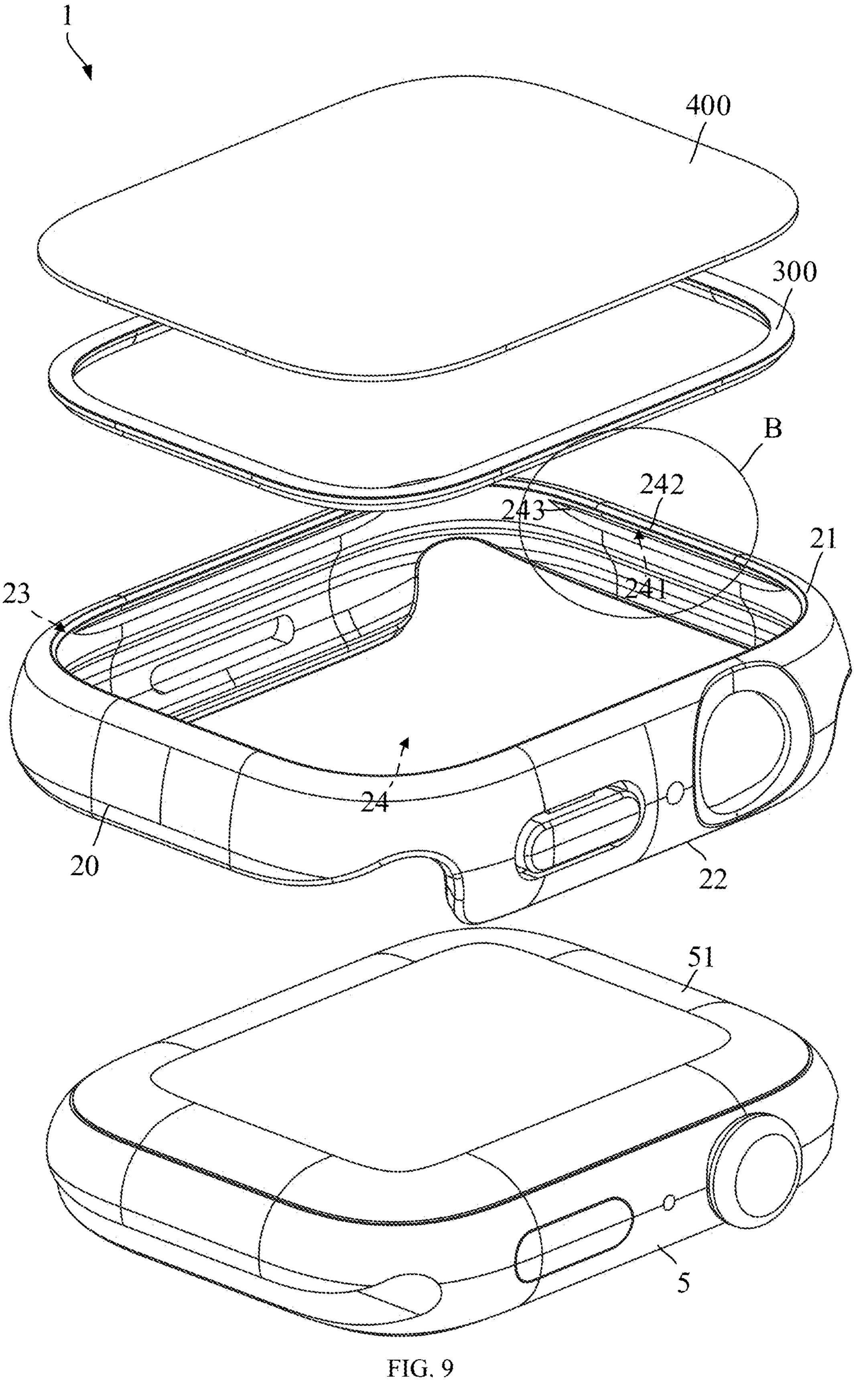
FIG. 9 is a schematic exploded view of the watch protection case shown in FIG. 6.
Figure 10:
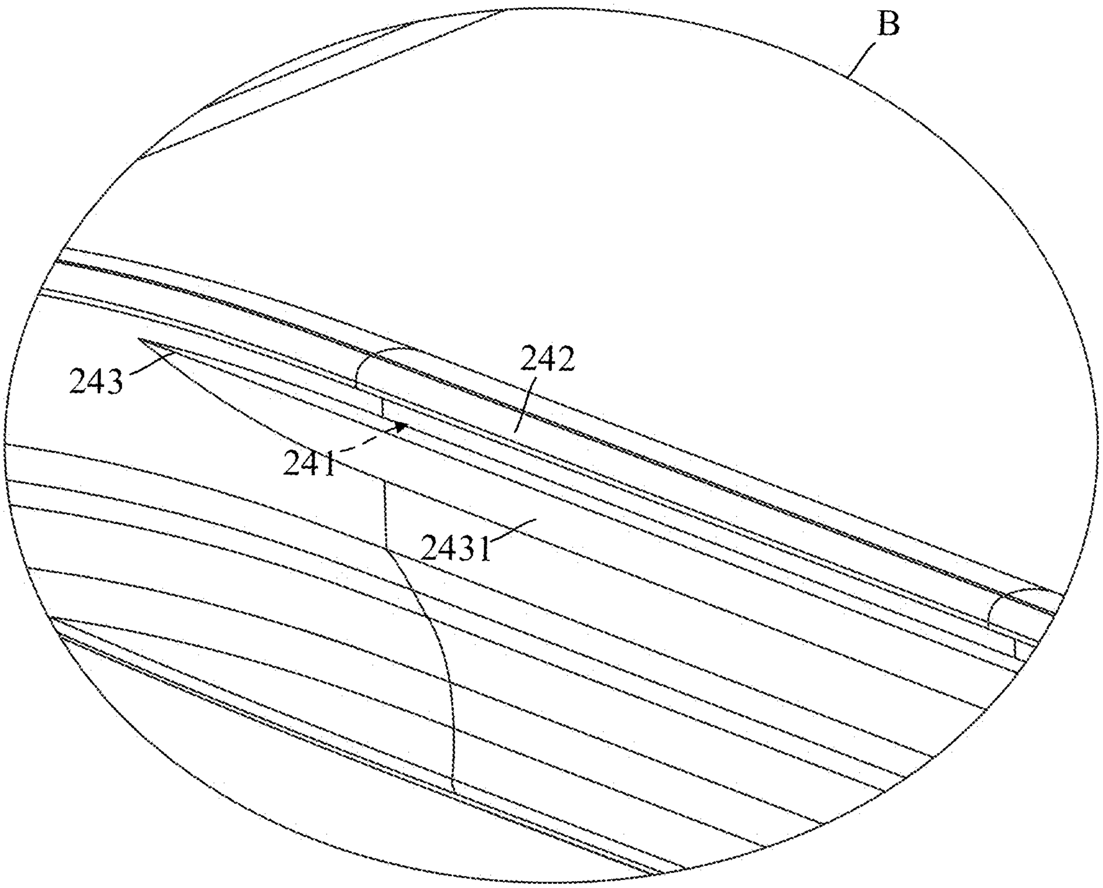
FIG. 10 is a schematic enlarged view of B of the watch protection case shown in FIG. 9.
Figure 11:
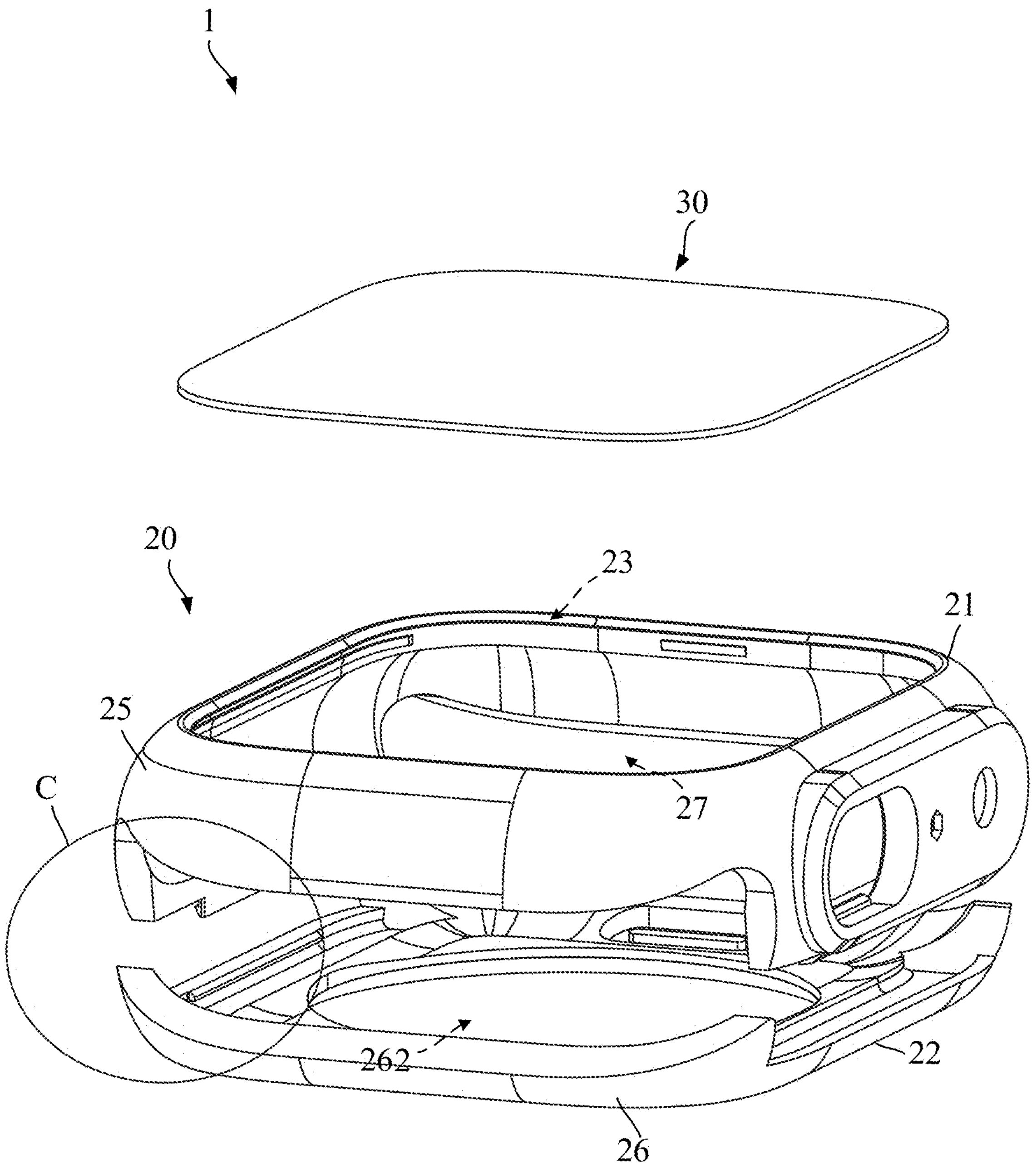
FIG. 11 is a schematic exploded view of a watch protection case according to a fourth embodiment of the present disclosure.
Figure 12:
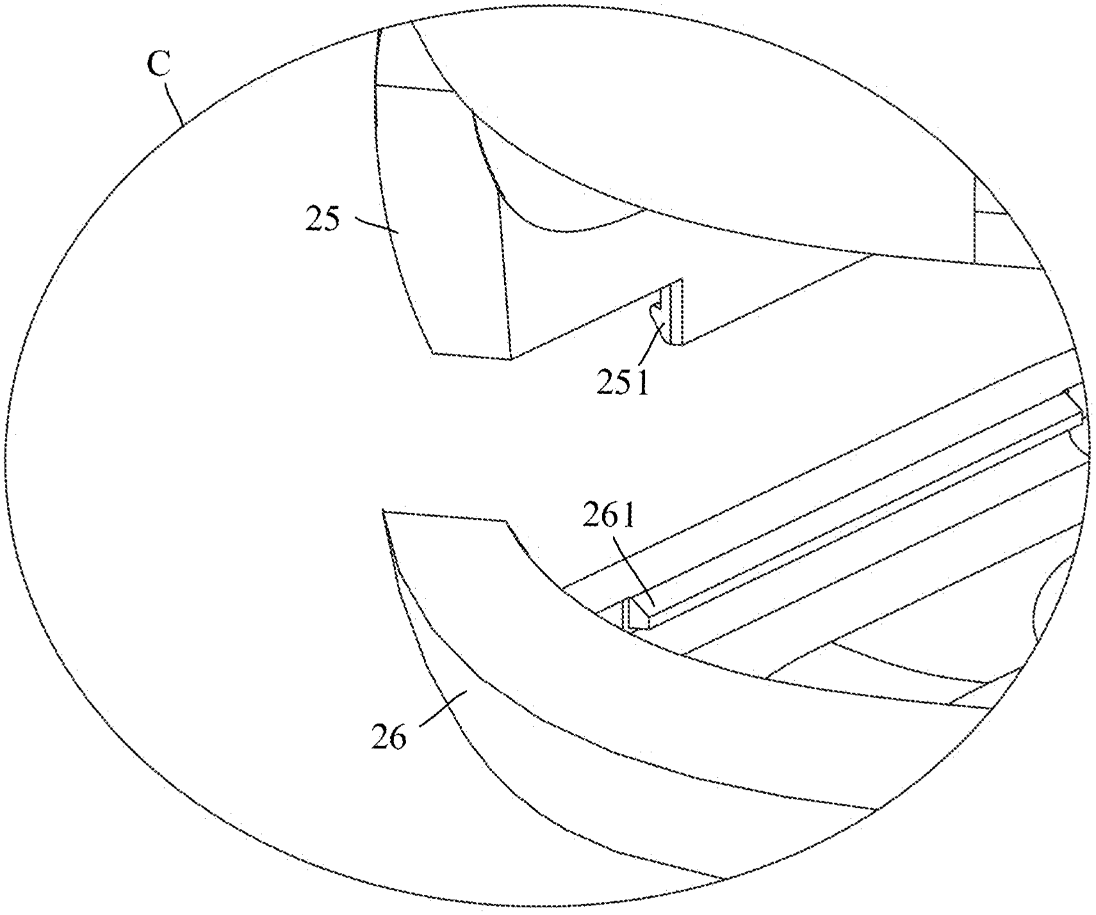
FIG. 12 is a schematic enlarged view of C of the watch protection case shown in FIG. 11.

Referring to FIG. 8 and FIG. 9, the snap edge 243 is provided with guiding surface 2431. The watch screen protection panel 400 can slide into the clamping groove 241 along the guiding surface 2431. Along the direction from the back surface 22 to the front surface 21, the guiding surface 2431 extends obliquely from a side of the snap edge 243 facing away from the convex edge 242 to a side of the snap edge facing the convex edge 242. In extension, a distance from the guiding surface 2431 to a center of the light-transmissive opening 24 is decreased gradually. The guiding surface 2431 is a curved surface. After the watch screen protection panel 400 and the waterproof bezel 300 get into the light-transmissive port 24, the watch screen protection panel 400 is pushed along the direction from the back surface 22 to the front surface 21. The edge of the watch screen protection panel 400 abuts against the guiding surface 2431. At least one of the edge of the watch screen protection panel 400 and the snap edge 243 deforms, such that the watch screen protection panel 400 slides into the clamping groove 241 from the side of the snap edge 243 facing away from the convex edge 242. The snap edge 243 and the convex edge 242 limit the watch screen protection panel 400 in the clamping groove 241, such that the watch screen protection panel 400 is connected to the housing 20 simply and quickly. The waterproof bezel 300 is located out of the clamping groove 241. The snap edge 243 may be made of a material such as rubber, such that the edge of the watch screen protection panel 400 is not damaged easily when clamped into the clamping groove 241.

The side of the snap edge 243 facing the convex edge 242 is provided with clamping surface 2432. The clamping surface 2432 is perpendicular to a direction from the front surface 21 to the back surface 22. When the edge of the watch screen protection panel 400 is embedded into the clamping groove 241, the clamping surface 2432 can abut against the watch screen protection panel 400. The clamping surface 2432 and the convex edge 242 clamp and fix the watch screen protection panel 400 at the same time. The clamping surface 2432 is parallel to the watch screen protection panel 400, so as to increase an abutting area between the clamping surface 2432 and the watch screen protection panel 400. Meanwhile, since the clamping surface 2432 is parallel to the watch screen protection panel 400, the watch screen protection panel 400 is not separated from the clamping groove 241 along the direction from the front surface 21 to the back surface 22, and the watch screen protection panel 400 is more stable.

A width of the snap edge 243 is less than a width of the convex edge 242. Both the width of the snap edge and the width of the convex edge are a length extending from the inner wall of the light-transmissive port 24 to a center of the light-transmissive port 24. After the edge of the watch screen protection panel 400 is embedded into the clamping groove 241 along the direction from the back surface 22 to the front surface 21, the watch screen protection panel 400 does not slide over the convex edge 242 excessively for an excessive force to cause separation of the watch screen protection panel 400 from the housing 20. In other embodiments, it is to be understood that when the watch screen protection panel 400 is embedded into the clamping groove 241 over the convex edge 242 through the light-transmissive window 23, the width of the snap edge 243 may also be greater than the width of the convex edge 242.

There are a plurality of snap edges 243. The plurality of snap edges 243 are circumferentially spaced on the inner wall of the light-transmissive port 24. In the embodiment, the plurality of snap edges 243 are circumferentially pairwise and opposite along the inner wall of the light-transmissive port 24, such that guiding surfaces 2431 on the snap edges 243 are also pairwise and opposite. When the watch screen protection panel 400 abuts against the guiding surface 2431, a squeezing force of the guiding surface 2431 against the watch screen protection panel 400 is broken down into two forces. In the two forces, one force is along the direction from the front surface 21 to the back surface 22, and the other force is toward the center of the watch screen protection panel 400. Forces of two opposite guiding surfaces 2431 toward the center of the watch screen protection panel 400 are opposite, such that the watch screen protection panel 400 is stressed uniformly. In other embodiments, it is to be noted that the snap edge 243 may also be a circumferentially closed annular structure. The snap edge 243 is coaxial with the light-transmissive port 24. The guiding surface 2431 is also circumferentially closed along the snap edge 243. When the watch screen protection panel 400 is embedded into the clamping groove 241, each position at a circumferential edge of the watch screen protection panel 400 abuts against the guiding surface 2431.

Referring to FIG. 7 and FIG. 8, in a second embodiment, the housing 20 includes first shell 25 and second shell 26. The first shell 25 and the second shell 26 are opposite to each other along the direction from the front surface 21 to the back surface 22. The front surface 21 is located at a side of the first shell 25 facing away from the second shell 26. The back surface 22 is located at a side of the second shell 26 facing away from the first shell 25. The first shell 25 and the second shell 26 are connected detachably. Mounting space 27 for mounting the watch body 5 is formed between the first shell and the second shell. When the first shell 25 and the second shell 26 are detached along the direction from the front surface 21 to the back surface 22, the watch body 5 can be mounted between the first shell 25 and the second shell 26. When the first shell 25 and the second shell 26 are interlocked with each other, the watch body 5 is clamped and fixed in the mounting space 27 between the first shell 25 and the second shell 26.

The first shell 25 is provided with the light-transmissive window 23 in the front surface 21. The second shell 26 is provided with opening 262 in the back surface 22. Both the light-transmissive window 23 and the opening 262 communicate with the mounting space 27. The light-transmissive window 23 and the opening 262 are respectively located at two opposite sides of the mounting space 27. The opening 262 can avoid a protrusion on a back of the watch body 5, such that after the watch body 5 is mounted in the mounting space 27, the back surface 22 is flush with the back of the watch body 5 to make the watch worn more comfortably. It is to be understood that in order to better attach the watch body 5, a shape of the opening 262 is the same as a shape of the protrusion on the back of the watch body 5. When there is no protrusion on the back of the watch body 5, the opening 262 may also not be provided.

Referring to FIG. 1, the first shell 25 and the second shell 26 can be detached and interlocked along the direction from the front surface 21 to the back surface 22. An end of a sidewall of the first shell 25 adjacent to the second shell 26 is provided with hook 251. An end of a sidewall of the second shell 26 adjacent to the first shell 25 is provided with clamping edge 261. A side of the hook 251 adjacent to the second shell 26 is a beveled structure. A side of the clamping edge 261 adjacent to the first shell 25 is also a beveled structure. When the first shell 25 gets close to the second shell 26 along the direction from the front surface 21 to the back surface 22, the hook 251 abuts against the clamping edge 261 and gets over the clamping edge 261 along the beveled structure, such that the hook 251 is clamped with the clamping edge 261, and thus the first shell 25 is connected to the second shell 26 quickly and stably. It is to be understood that the hook 251 may also be provided on the sidewall of the second shell 26, and the clamping edge 261 may also be provided on the sidewall of the first shell 25.

The present disclosure is described above with reference to several typical implementations. It should be understood that the terms used herein are intended for illustration, rather than limiting. The present disclosure may be specifically implemented in many forms without departing from the spirit or essence of the present disclosure. Therefore, it should be understood that the above embodiments are not limited to any of the above-mentioned details, but should be broadly interpreted according to the spirit and scope defined by the appended claims. Therefore, any changes and modifications falling within the claims or the equivalent scope thereof should be covered by the appended claims.

What is claimed is:

1. A waterproof bezel, comprising a first bezel body and a second bezel body, wherein the first bezel body and the second bezel body are connected along an axial direction of the waterproof bezel; an acute angle is formed between the first bezel body and the second bezel body; a deformation space is formed between a portion of the first bezel body and portion of the second bezel body, wherein the portion of the first bezel body and the portion of the second bezel body form the acute angle; the first bezel body is configured to bond a watch screen protection panel; and the second bezel body is configured to abut against a watch screen, wherein the deformation space is located at an outer side of the waterproof bezel; an inner surface of the second bezel body is a conical surface; and in a direction from the second bezel body to the first bezel body along the axial direction of the waterproof bezel, an inner diameter of the conical surface is decreased gradually.

2. The waterproof bezel according to claim 1, wherein the first bezel body is provided with a first connecting surface; the first connecting surface is provided at a side of the first bezel body adjacent to the second bezel body; the first connecting surface is perpendicular to the axial direction of the waterproof bezel; a side of the second bezel body facing away from the conical surface is provided with a second connecting surface; and the first connecting surface and the second connecting surface are arranged in the acute angle and form the deformation space.

3. The waterproof bezel according to claim 2, wherein a circumferential contour of the conical surface is same as an outer contour of the watch screen;

the second bezel body is mounted on the watch screen, the conical surface abuts against the watch screen, and contact points between the conical surface and the watch screen form a circumferentially closed annular shape; and the watch screen continues to squeeze the conical surface, the second bezel body deforms and accumulates an elasticity, an included angle between the second connecting surface and the first connecting surface is decreased, and the deformation space is decreased, such that the conical surface has an increased abutting elasticity against the watch screen, and a contact area between the conical surface and the watch screen is increased.

4. The waterproof bezel according to claim 2, wherein the second connecting surface is a circumferentially closed structure along the second bezel body; and each position of the second connecting surface is parallel to the corresponding conical surface, such that the second connecting surface and the conical surface have a same degree of deformation.

5. A light-transmissive watch panel, comprising the watch screen protection panel and the waterproof bezel according to claim 1, wherein the first bezel body is bonded to the watch screen protection panel.

6. A watch protection case, comprising a housing and the light-transmissive watch panel according to claim 5, wherein a light-transmissive window and a light-transmissive port are sequentially provided from a front surface of the housing to a back surface of the housing;

and the watch screen protection panel is fixedly provided on an inner wall of the light-transmissive port.

* * * * *